(12) United States Patent
Fuji et al.

(10) Patent No.: US 11,134,162 B2
(45) Date of Patent: Sep. 28, 2021

(54) IMAGE READING APPARATUS AND OPENING/CLOSING APPARATUS

(71) Applicant: SEIKO EPSON CORPORATION, Tokyo (JP)

(72) Inventors: Keita Fuji, Nakama (JP); Tomoyuki Mokuo, Kitakyushu (JP); Hidenori Harada, Kitakyushu (JP); Kazuya Hirahara, Kitakyushu (JP); Tokujiro Okuno, Kitakyushu (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/005,604

(22) Filed: Aug. 28, 2020

(65) Prior Publication Data

US 2021/0067643 A1    Mar. 4, 2021

(30) Foreign Application Priority Data

Aug. 29, 2019 (JP) .............................. JP2019-156437

(51) Int. Cl.
*H04N 1/04* (2006.01)
*H04N 1/00* (2006.01)
*H04N 1/12* (2006.01)

(52) U.S. Cl.
CPC ....... *H04N 1/00535* (2013.01); *H04N 1/1215* (2013.01)

(58) Field of Classification Search
CPC .......................... H04N 1/00535; H04N 1/1215

USPC ......................................................... 358/474
See application file for complete search history.

(56) References Cited

U.S. PATENT DOCUMENTS

| | | | |
|---|---|---|---|
| 2010/0053701 A1* | 3/2010 | Yoshida ............ | H04N 1/00535 358/474 |
| 2017/0279991 A1 | 9/2017 | Shiota | |
| 2018/0257895 A1* | 9/2018 | Kaneko ................. | B65H 31/02 |
| 2020/0252512 A1* | 8/2020 | Harada ............. | H04N 1/00591 |
| 2020/0374413 A1* | 11/2020 | Koyanagi ......... | H04N 1/00795 |

FOREIGN PATENT DOCUMENTS

| | | |
|---|---|---|
| JP | 2016177087 A | 10/2016 |
| JP | 2017171426 A | 9/2017 |

* cited by examiner

*Primary Examiner* — Gabriel I Garcia
(74) *Attorney, Agent, or Firm* — Chip Law Group

(57) ABSTRACT

An image reading apparatus includes a lower unit, and a discharge tray and an upper unit that pivot with respect to the lower unit. An axis center of the discharge tray and an axis center of the upper unit are common, the image reading apparatus includes a first damping portion that damps pivoting of the discharge tray in at least an opening direction, and a second damping portion that damps pivoting of the upper unit in at least a closing direction, and the upper unit is configured to engage with the first damping portion, and, when the upper unit is closed from a state in which at least the discharge tray and the upper unit are opened, in addition to a damping force of the second damping portion, a damping force of the first damping portion is applied to the upper unit.

7 Claims, 12 Drawing Sheets

IMAGE READING APPARATUS AND OPENING/CLOSING APPARATUS

The present application is based on, and claims priority from JP Application Serial Number 2019-156437, filed Aug. 29, 2019, the disclosure of which is hereby incorporated by reference herein in its entirety.

BACKGROUND

1. Technical Field

The present disclosure relates to an image reading apparatus that reads a document image. In addition, the present disclosure relates to an opening/closing apparatus that includes a first pivoting body and a second pivoting body.

2. Related Art

Some scanners as an example of an image reading apparatus are of a sheet feed type that scans documents while the documents are being transported, and, in addition, among such scanners, there is a scanner in which a discharge tray is pivotally provided with respect to an apparatus main body as illustrated in JP-A-2016-177087. In some scanners, as illustrated in JP-A-2017-171426, the main body of the apparatus is formed of a lower unit and an upper unit, and the upper unit is provided so as to pivot with respect to the lower unit.

When providing a pivoting body such as the discharge tray or the upper unit as described above, there are cases where it is desired to provide a damper that damps the pivoting when pivoting in the opening direction or the closing direction. For example, in many cases, the discharge tray has a larger pivot angle from the vertical position when it is opened than when it is closed, and when opened vigorously, it is easy to cause damage or a collision noise, and therefore, it is preferable to impart a damping effect by using a damper during pivoting at least when opening.

In addition, the upper unit described in JP-A-2017-171426 has a larger pivot angle from the vertical orientation when it is closed than when it is opened, and the upper unit is a heavy object. Therefore, when it is closed, the upper unit pivots more swiftly by its own weight than when it is opened. Therefore, in the case of the upper unit, it is preferable to impart the damping effect by the damper during pivoting at least when closing.

However, when a damper is provided for each of the two pivoting bodies and an attempt is made to impart a high damping effect to one of the two pivoting bodies that is heavier than the other, since it is necessary to use a large damper, there is a problem that the apparatus becomes large.

SUMMARY

An image reading apparatus according to an aspect of the present disclosure includes a lower unit that includes a reader that reads a document, a discharge tray that is a pivoting body configured to, by pivoting with respect to the lower unit, take a closed state and an open state in which the discharge tray is more separated from the lower unit than in the closed state, and on which documents scanned and discharged are stacked, and an upper unit that is a pivoting body configured to, by pivoting with respect to the lower unit, take a closed state in which the upper unit is located between the lower unit and the discharge tray and an open state in which the upper unit is more separated from the lower unit than in the closed state, and that forms a document transport path with the lower unit between the upper unit and the lower unit, a first damping portion that damps pivoting of the discharge tray in at least an opening direction, and a second damping portion that damps pivoting of the upper unit in at least a closing direction. An axis center of a first pivot shaft that is a pivot shaft of the discharge tray and an axis center of a second pivot shaft that is a pivot shaft of the upper unit are common, the upper unit is configured to engage with the first damping portion, and when the upper unit is closed from a state in which at least the discharge tray and the upper unit are opened, a damping force of the first damping portion is applied to the upper unit in addition to a damping force of the second damping portion.

DESCRIPTION OF EXEMPLARY EMBODIMENTS

Figure 1:
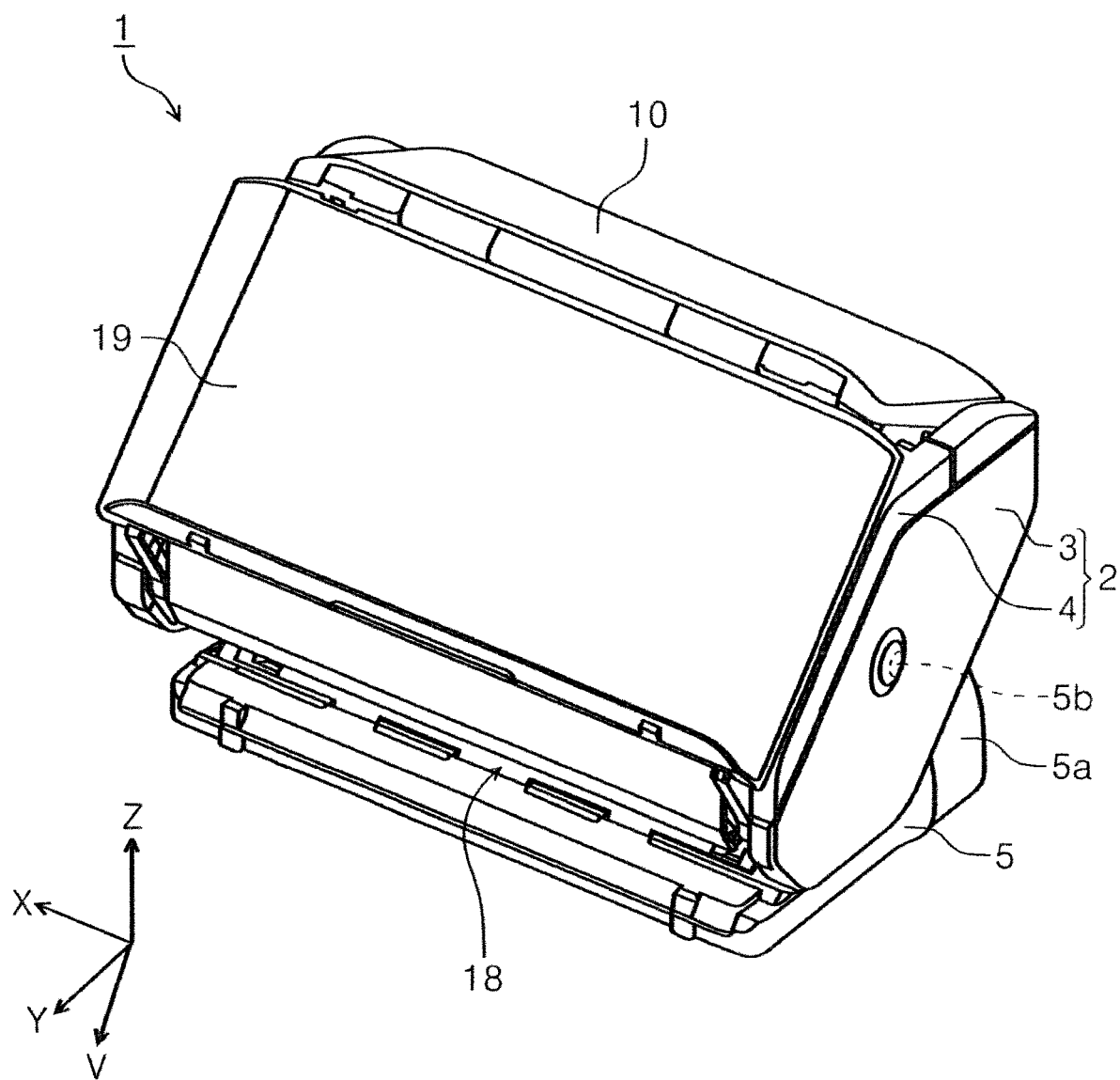
FIG. 1 is an external perspective view of a scanner with an apparatus main body in a second orientation as viewed from the front.

Hereinafter, the present disclosure will be schematically described.

According to a first aspect of the present disclosure, an image reading apparatus includes a lower unit that includes a reader that reads a document, a discharge tray that is a pivoting body configured to, by pivoting with respect to the lower unit, take a closed state and an open state in which the discharge tray is more separated from the lower unit than in the closed state, and on which documents scanned and discharged are stacked, an upper unit that is a pivoting body configured to, by pivoting with respect to the lower unit, take a closed state in which the upper unit is located between the lower unit and the discharge tray and an open state in which the upper unit is more separated from the lower unit than in the closed state, and that forms a document transport path with the lower unit between the upper unit and the lower unit, a first damping portion that damps pivoting of the discharge tray in at least an opening direction, and a second damping portion that damps pivoting of the upper unit in at least a closing direction. An axis center of a first pivot shaft that is a pivot shaft of the discharge tray and an axis center of a second pivot shaft that is a pivot shaft of the upper unit are common, the upper unit is configured to engage with the first damping portion, and when the upper unit is closed from a state in which at least the discharge tray and the upper unit are opened, a damping force of the first damping portion is applied to the upper unit in addition to a damping force of the second damping portion.

According to this aspect, in the image reading apparatus that includes a discharge tray, a first damping portion that damps the pivoting of the discharge tray, an upper unit, and a second damping portion that damps the pivoting of the upper unit, since the upper unit is configured to engage with the first damping portion, and the damping force of the first damping portion in addition to the damping force of the second damping portion is applied to the upper unit when the upper unit is closed from a state in which at least the discharge tray and the upper unit are opened, it is possible to reliably damp the pivoting of the upper unit while reducing the size of the second damping portion, that is, suppressing an increase in the size of the apparatus.

In a second aspect according to the first aspect, the image reading apparatus further includes a first one-way clutch interposed between the upper unit and the second pivot shaft, in which, by action of the first one-way clutch, when the upper unit pivots in an opening direction, the damping force of the second damping portion does not act on the upper unit, and when the upper unit pivots in the closing direction, the damping force of the second damping portion acts on the upper unit.

According to this aspect, since, by the action of the first one-way clutch, when the upper unit pivots in the opening direction, the damping force of the second damping portion does not act on the upper unit, and when the upper unit pivots in the closing direction, the damping force of the second damping portion acts on the upper unit, the operability when opening the upper unit is improved.

In a third aspect according to the second aspect, the image reading apparatus further includes a second one-way clutch interposed between the discharge tray and the first pivot shaft, in which, by action of the second one-way clutch, when the discharge tray pivots in the opening direction, the damping force of the first damping portion acts on the discharge tray, and when the discharge tray pivots in a closing direction, the damping force of the first damping portion does not act on the discharge tray.

According to this aspect, since, when the discharge tray pivots in the opening direction, the pivoting damping by the first damping portion acts, and when the discharge tray pivots in the closing direction, the pivoting damping by the first damping portion does not act due to the action of the second one-way clutch, operability when closing the discharge tray is improved.

In a fourth aspect according to any of the first to third aspects, the first pivot shaft and the second pivot shaft are configured by a shaft body in common.

According to this aspect, since the first pivot shaft and the second pivot shaft are configured by a common shaft body, the cost of the apparatus can be reduced In a fifth aspect according to any of the first to fourth aspects, the first damping portion is provided on each side of the discharge tray in an axial direction of the first pivot shaft, and the second damping portion is provided on each side of the upper unit in an axial direction of the second pivot shaft.

According to this aspect, since the first damping portion is provided on each side of the discharge tray in the axial direction of the first pivot shaft, the effect of damping the pivoting of the discharge tray can be obtained in a good balance in the axial direction. Further, since the second damping portion is provided on each side of the upper unit in the axial direction of the second pivot shaft, the effect of damping the pivoting of the upper unit can be obtained in a good balance in the axial direction.

In a sixth aspect according to any of the first to fifth aspects, the discharge tray includes an arm portion supported by the first pivot shaft, and a tray body portion attached to the arm portion.

According to this aspect, since the discharge tray includes an arm portion supported by the first pivot shaft, and a tray body portion attached to the arm portion, assemblability is improved as compared with a configuration in which the arm portion and the tray body portion are integrated.

In a seventh aspect of the present disclosure, an opening/closing apparatus includes a first pivoting body configured to, by pivoting with respect to a unit body, take a closed state and an open state in which the first pivoting body is more separated from the unit body than in the closed state, a second pivoting body configured to, by pivoting with respect to the unit body, take a closed state in which the second pivoting body is located between the unit body and the first pivoting body and an open state in which the second pivoting body is more separated from the unit body than in the closed state, a first damping portion that damps pivoting of the first pivoting body in at least an opening direction, and a second damping portion that damps pivoting of the second pivoting body in at least a closing direction. An axis center of a first pivot shaft that is a pivot shaft of the first pivoting body and an axis center of a second pivot shaft that is a pivot shaft of the second pivoting body are common, the second pivoting body is configured to engage with the first damping portion, and when the second pivoting body is closed from a state in which at least the first pivoting body and the second pivoting body are opened, a damping force of the first damping portion is applied to the second pivoting body in addition to a damping force of the second damping portion.

According to this aspect, in the opening/closing apparatus including a first pivoting body, a first damping portion that damps the pivoting of the first pivoting body, a second pivoting body, and a second damping portion that damps the pivoting of the second pivoting body, since the second pivoting body is configured to engage with the first damping portion and, in addition to the damping force of the second damping portion, the damping force of the first damping portion is applied to the second pivoting body when the second pivoting body is closed from a state in which at least the first pivoting body and the second pivoting body are opened, it is possible to reliably damp the pivoting of the second pivoting body while reducing the size of the second damping portion, that is, suppressing an increase in the size of the apparatus.

Hereinafter, the present disclosure will be specifically described.

A scanner 1 configured to read at least one of a front surface and a rear surface of a document will be given as an example of the image reading apparatus and the opening/closing apparatus. The scanner 1 is a so-called document scanner that performs reading while moving a document relative to a reader.

Further, in the XYZ coordinate system illustrated in each drawing, the X-axis direction is the apparatus width direction and the document width direction. The Y-axis direction is an apparatus depth direction, and is a direction along the horizontal direction. The Z-axis direction is a direction along the vertical direction. In addition, the V-axis direction is a direction parallel to a document transport path T described later, and the angle formed with the Y-axis direction changes depending on the orientation of the apparatus.

In the present embodiment, the +Y direction is a direction from the rear of the apparatus to the front, and the −Y direction is a direction from the front of the apparatus to the rear. In addition, when viewed from the front of the apparatus, the left is defined as the +X direction and the right is defined as the −X direction.

In addition, hereinafter, the direction (+V direction) in which the document is transported may be referred to as "downstream", and the opposite direction (−V direction) may be referred to as "upstream".

In FIGS. 1 to 5, the scanner 1 includes an apparatus main body 2 and a support base 5 that supports the apparatus main body 2 so as to pivot.

The apparatus main body 2 includes a lower unit 3 as a unit body and an upper unit 4 as a second pivoting body.

Figure 4:
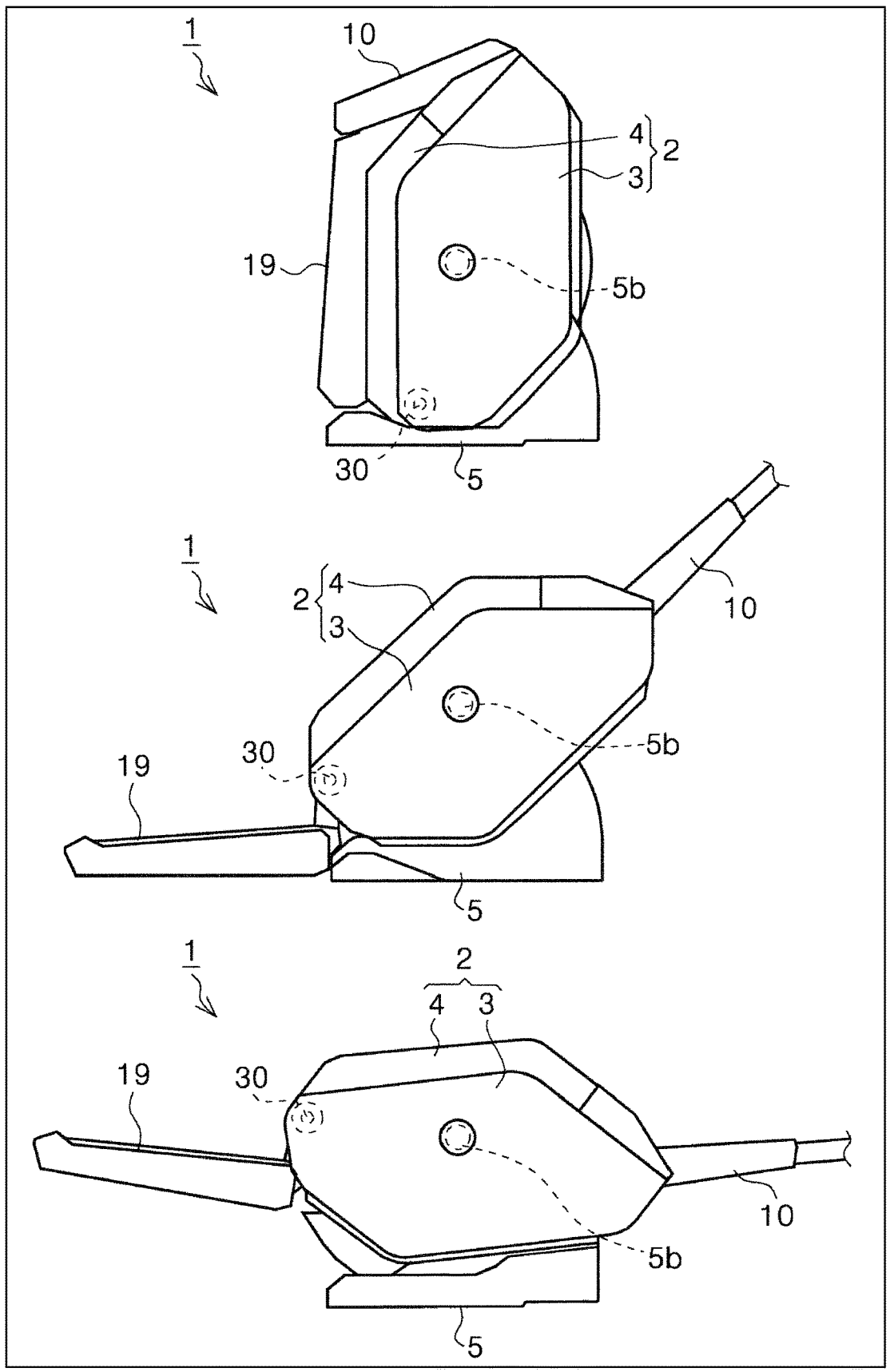
FIG. 4 is a diagram illustrating variations in the orientation of the apparatus main body.
Figure 5:
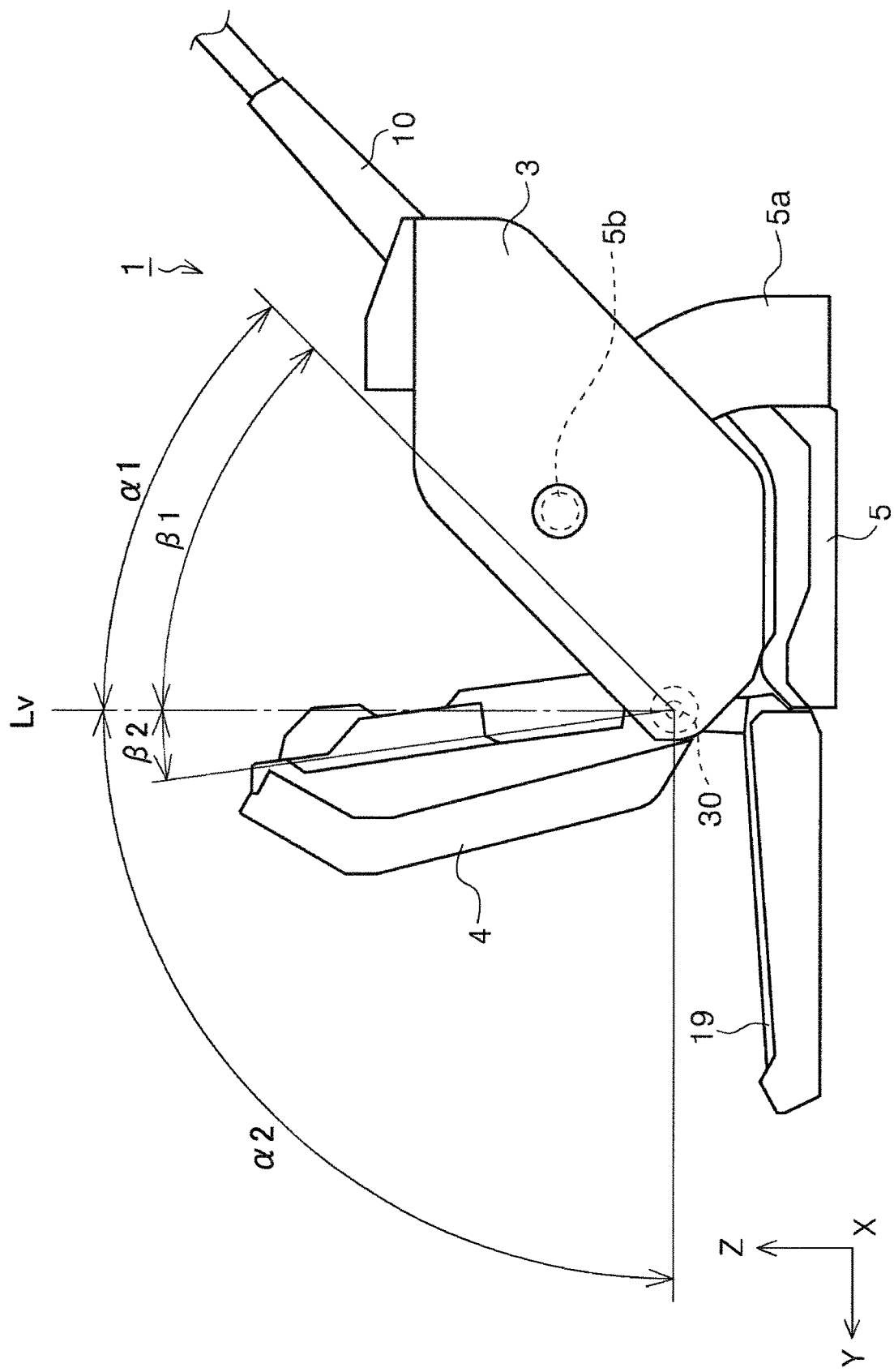
FIG. 5 is a side view of the scanner with the apparatus main body in the second orientation and the front surface cover and an upper unit in an open state.

The upper unit 4 is provided so as to open and close by pivoting about a pivot shaft 30 (refer to FIGS. 4 and 5) with respect to the lower unit 3, and the document transport path T can be exposed by opening the upper unit 4 to the front of the apparatus. In FIG. 5, the upper unit 4 is in an open state.

The lower unit 3 forming the apparatus main body 2 is provided so as to pivot about a pivot shaft 5b with respect to an arm portion 5a forming the support base 5, and is configured to change orientation by pivoting.

The scanner 1 according to the present embodiment is configured to be able to hold three orientations with an orientation holder (not illustrated), and two of the three orientations are orientations when reading a document, and the other one is an orientation when not in use. The orientations illustrated in the center and bottom diagrams in FIG. 4 are each one of the orientations when reading a document, and the orientation illustrated in the top diagram in FIG. 4 is the orientation when not in use. In the orientation when not in use, the projected area on the mounting surface of the scanner 1 is the smallest, and more specifically, the orientation when not in use is an orientation in which the occupied space in the Y-axis direction is minimized.

Hereinafter, for the sake of convenience, the orientation illustrated in the top diagram in FIG. 4 will be referred to as the "storage orientation", the orientation illustrated in the center diagram in FIG. 4 will be referred to as the "normal orientation", and the orientation illustrated in the bottom diagram in FIG. 4 will be referred to as the "horizontal orientation".

Figure 2:
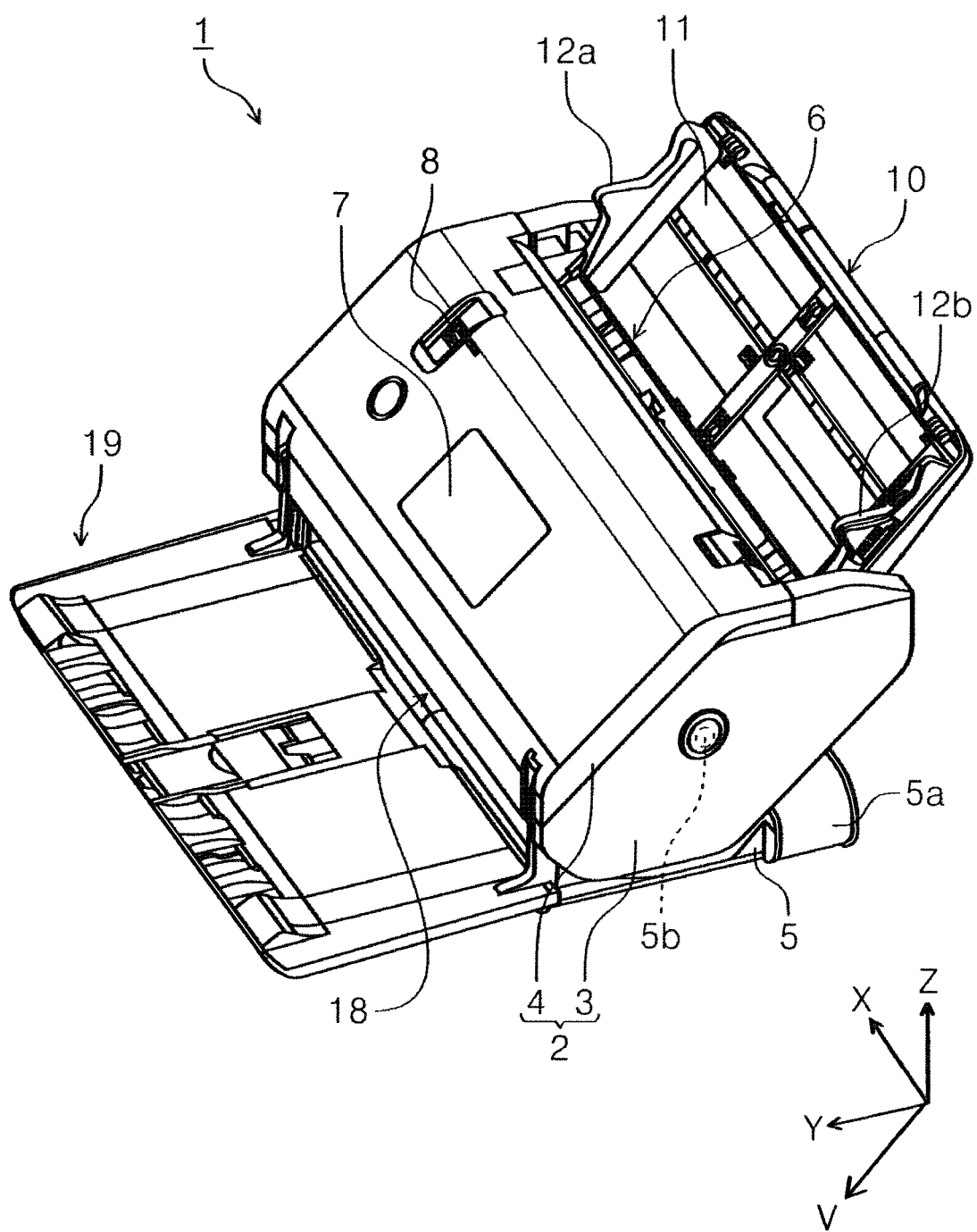
FIG. 2 is an external perspective view of the scanner when the apparatus main body is in the second orientation and a front surface cover is opened as viewed from the front.
Figure 3:
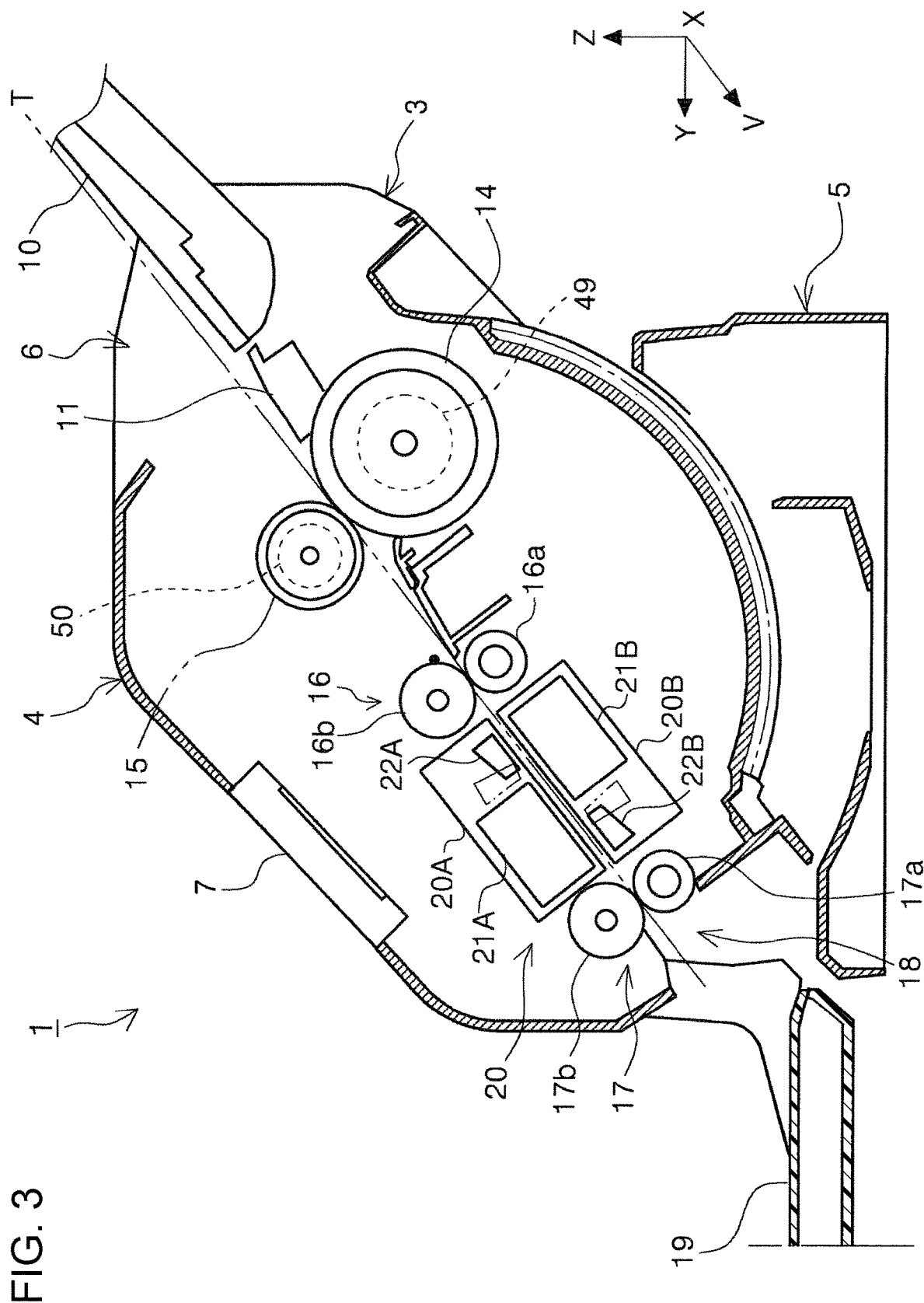
FIG. 3 is a sectional view of a document transport path of the scanner when the apparatus main body is in the second orientation, as viewed from a width direction.

The upper unit 4 includes a front surface cover 19, as a first pivoting body and a discharge tray, and the lower unit 3 includes an upper surface cover 10. The front surface cover 19 is provided so as to pivot about the pivot shaft 30 with respect to the lower unit 3 and the upper unit 4, and by pivoting, the front surface cover 19 can take a closed state as illustrated in FIG. 1 and an open state as illustrated in FIGS. 2, 3, and 5. When the front surface cover 19 is opened, it functions as a discharge tray that receives documents that are read and discharged.

The upper unit 4 includes, on an upper surface, an operation panel 7 as illustrated in FIG. 2, with which a user interface (UI) is realized on which various reading settings and reading execution operations are performed and which displays the contents of the reading settings and the like. In the present embodiment, the operation panel 7 is a so-called touch panel that enables both display and input, and also serves as an operation unit for performing various operations and a display unit for displaying various information. The operation panel 7 is exposed by opening the front surface cover 19.

The upper surface cover 10 provided on the lower unit 3 is provided so as to pivot with respect to the lower unit 3, and, by pivoting, can take the closed state illustrated in FIG. 1 and the open state illustrated in FIGS. 2, 3, and 5. When the upper surface cover 10 is opened, the upper surface cover 10 functions as a document supporting tray that supports a document to be fed. In FIG. 2, reference signs 12a and 12b denote edge guides that guide the side edges of the document.

Figure 6:
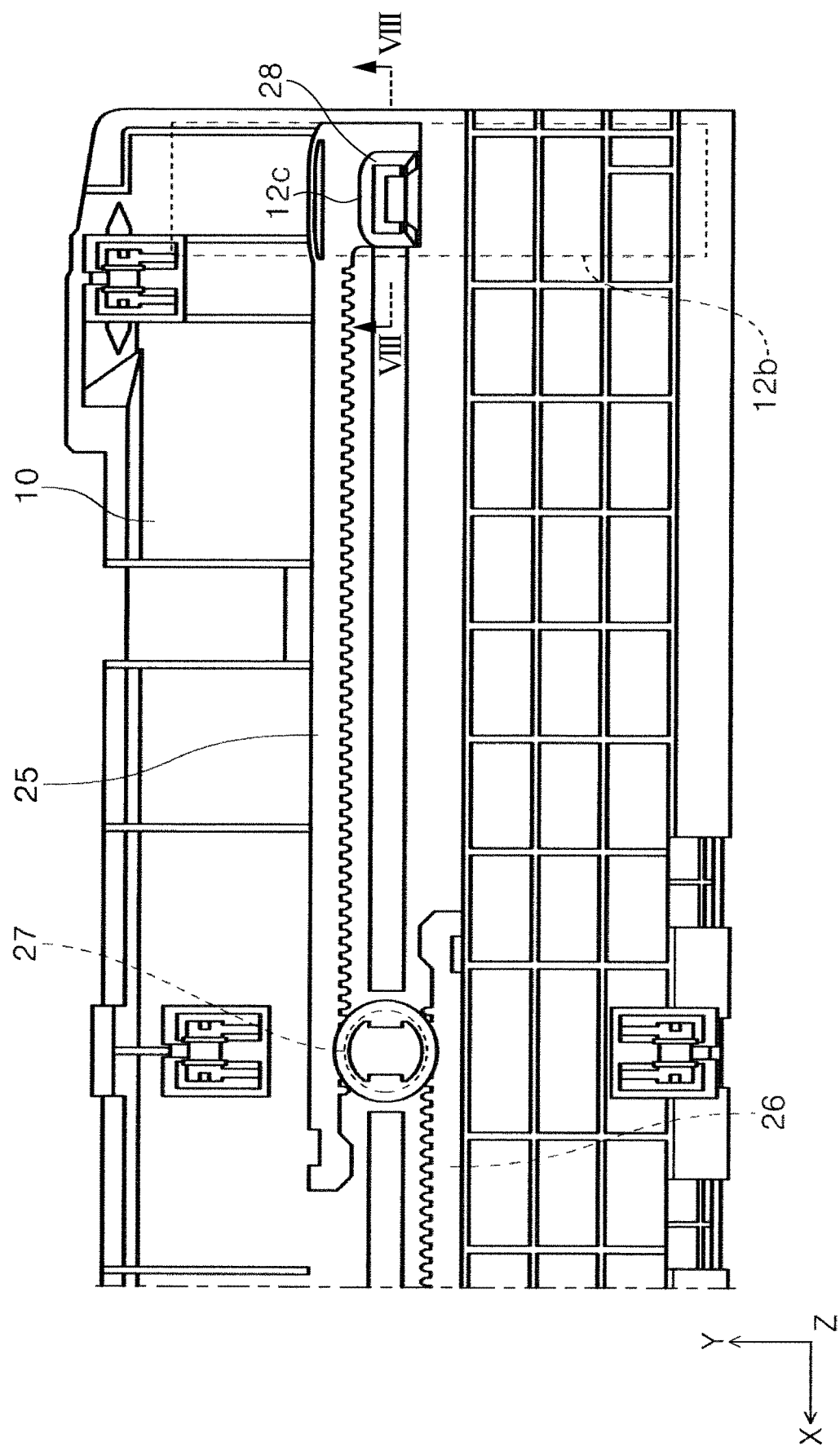
FIG. 6 is a plan view of a rear surface of the upper surface cover.

The edge guides 12a and 12b are configured to approach and separate from each other by a rack and pinion mechanism illustrated in FIG. 6. Reference sign 25 denotes a first rack to which the edge guide 12b is fixed, and reference sign 26 denotes a second rack to which the edge guide 12a (not illustrated in FIG. 6) is fixed. A pinion 27 is provided between the first rack 25 and the second rack 26, and the first rack 25 and the second rack 26 mesh with the pinion 27.

Figure 7:
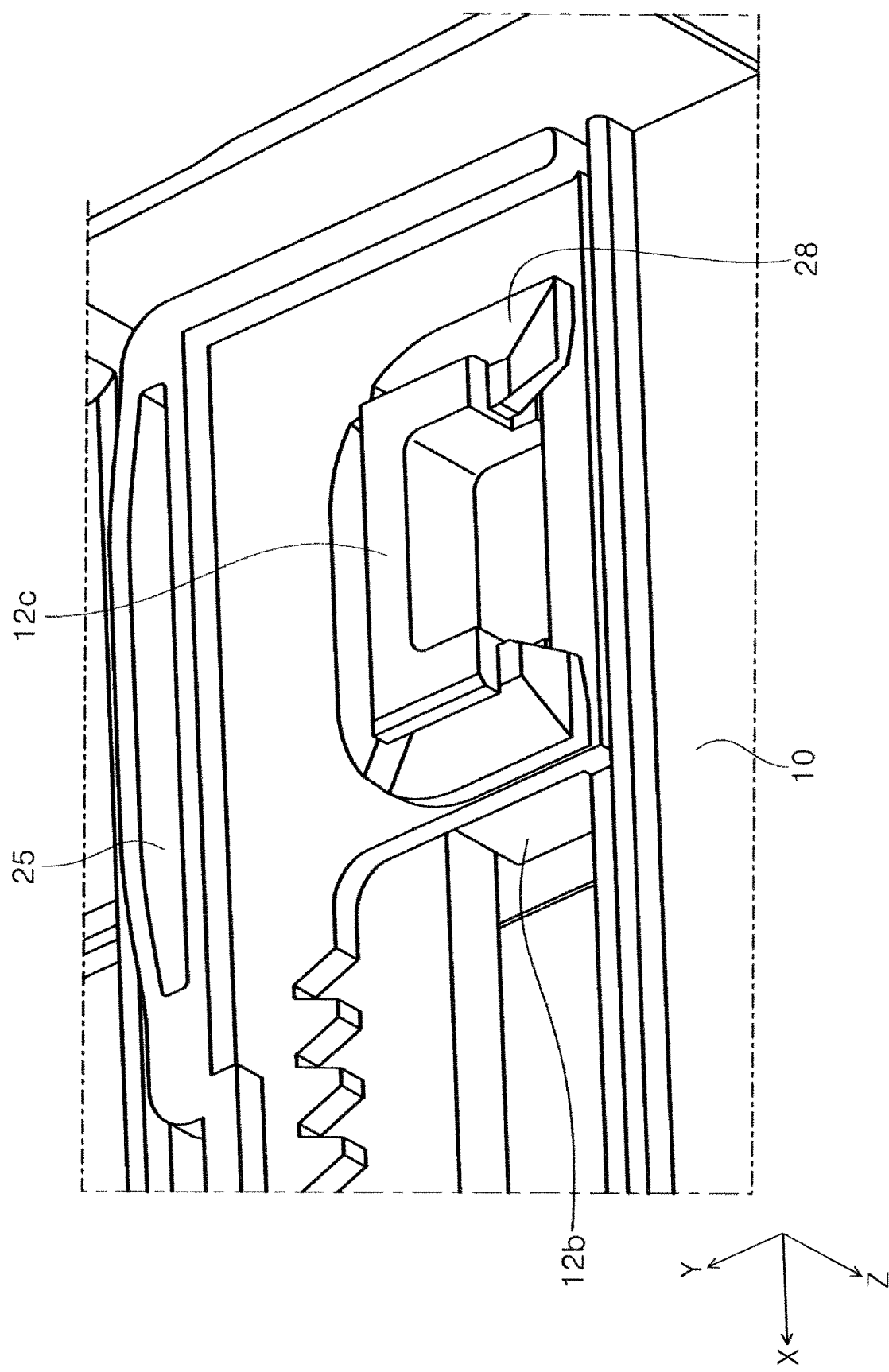
FIG. 7 is a partially enlarged perspective view of the rear surface of the upper surface cover.
Figure 8:
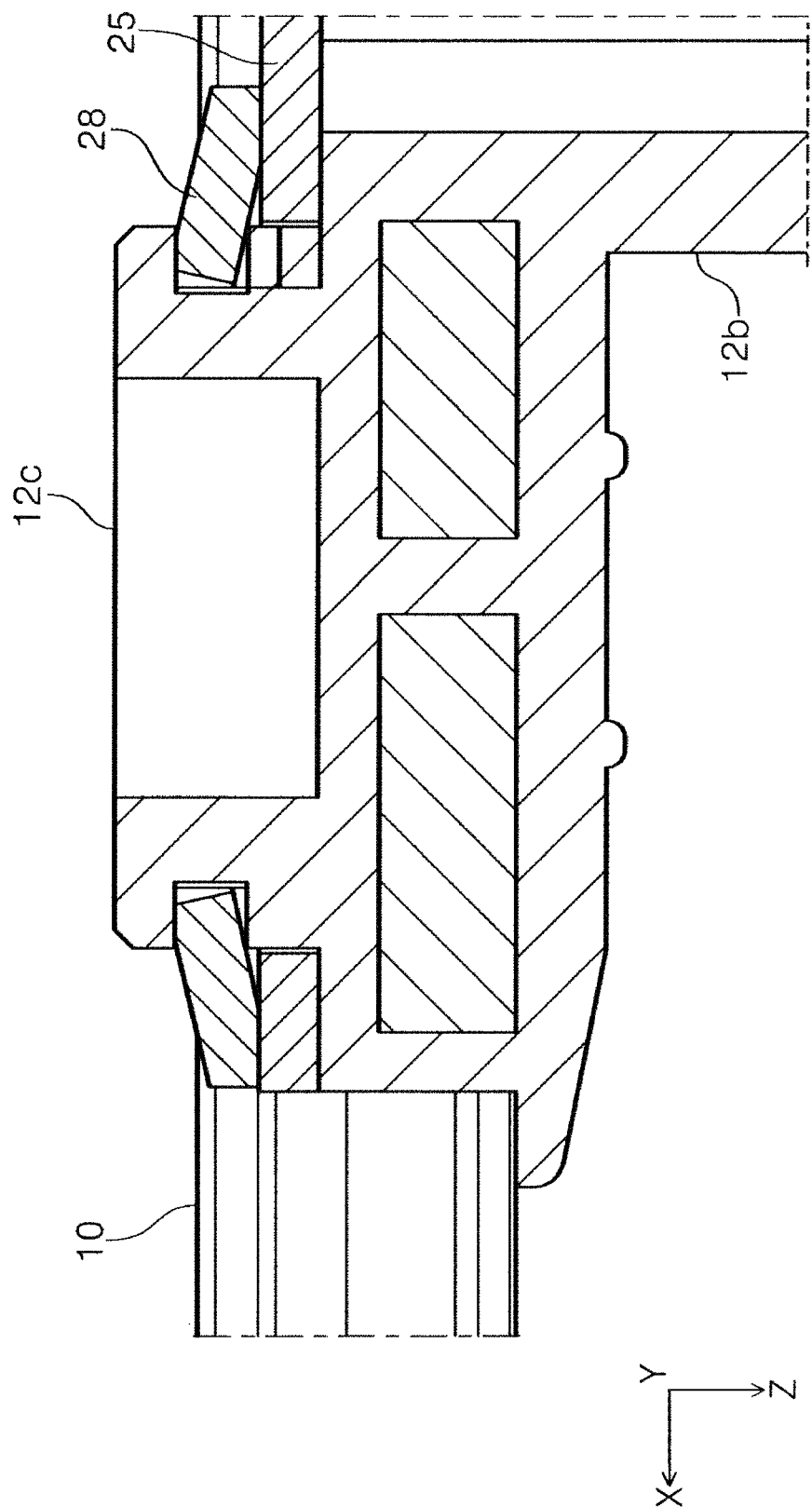
FIG. 8 is a sectional view taken along line VIII-VIII in FIG. 6.

Each of the edge guides is fixed to a corresponding rack by a C ring 28 illustrated in FIGS. 7 and 8. Hereinafter, the fixing structure that fixes the edge guide 12b to the first rack 25 will be described as an example; however, the fixing structure that fixes the edge guide 12a to the second rack 26 is also the same.

The rear surface side of the edge guide 12b is exposed on the rear surface side of the upper surface cover 10 as indicated by reference numeral 12c, and the C ring 28 is provided around the exposed portion 12c. The edge guide 12b is fixed by the C ring 28 so as not to come off in the +Z direction.

As illustrated in FIG. 8, the C ring 28 has a shape in which the position of the inner circumference is different from the position of the outer circumference in the thickness direction, that is, the Z-axis direction, and when the C ring 28 is attached to the exposed portion 12c, the elasticity of the C ring 28 acts between the first rack 25 and the exposed portion 12c in the Z-axis direction. As a result, rattling in the Z-axis direction between the edge guide 12b and the first rack 25 is suppressed.

Returning to FIG. 2, at an upper portion of the apparatus main body 2, there is provided a feeding port 6, which is continuous with the inside of the apparatus main body 2, and a document set on the upper surface cover 10 is sent from the feeding port 6 toward the inside of the apparatus main body 2.

Next, with reference to mainly FIG. 3, the document transport path in the scanner 1 will be described.

The document transport path T is a substantially linear document transport path formed between the lower unit 3 and the upper unit 4.

The upper surface cover 10 described above is provided at the most upstream of the document transport path T, and on the downstream of the upper surface cover 10, there is provided a feeding roller 14 that feeds a document set on the upper surface cover 10 downstream, and a separation roller 15 that nips and separates the document between the separation roller 15 and the feeding roller 14. The feeding roller 14 contacts the lowest one of the documents set on the upper surface cover 10. Therefore, when a plurality of documents are set on the upper surface cover 10, the documents are fed downstream in order from the lowest document.

The feeding roller 14 obtains a rotational torque from a motor (not illustrated) and rotates in a counterclockwise direction in FIG. 3.

A rotational torque that rotates in the counterclockwise direction in FIG. 3 is transmitted to the separation roller 15 from a motor (not illustrated) via a torque limiter (not illustrated). The separation roller 15 is provided so as to be able to move forward and backward with respect to the feeding roller 14, and is pressed toward the feeding roller 14 by a presser (not illustrated).

When there is no document between the feeding roller 14 and the separation roller 15 or when there is only one document, the separation roller 15 is driven to rotate in a clockwise direction in FIG. 3 by rotation of the feeding roller 14 irrespective of the rotational torque received from a motor (not illustrated) due to the occurrence of slipping of the torque limiter (not illustrated).

When second and subsequent documents enter between the feeding roller 14 and the separation roller 15 in addition to the document to be fed, because of the occurrence of slippage between the documents, the separation roller 15 is caused to rotate in a counterclockwise direction in FIG. 3 by the rotational torque received from a motor (not illustrated). As a result, double feeding of documents is suppressed.

Here, as illustrated in FIG. 2, the apparatus main body 2 is provided with a switching lever 8. The switching lever 8 can switch between a normal position, which is a neutral position, a soft separation position which is tilted from the normal position toward the front direction, that is, the +Y direction, and a non-separation position, which is tilted from the normal position toward the apparatus rear direction, that is, the −Y direction. When the switching lever 8 is switched to the soft separation position, the pressing force of the presser that presses the separation roller 15 toward the feeding roller 14 by an adjusting mechanism (not illustrated) is made weaker than that when the switching lever 8 is at the normal position. In addition, when the switching lever 8 is switched to the non-separation position, the driving force from the motor is not transmitted to the separation roller 15 by a switching mechanism (not illustrated).

The above-described soft separation position is recommended for use when the lower unit 3 is in the horizontal position. In addition, the above non-separation position is recommended when the document to be transported is a booklet.

Further, depending on the specifications of the apparatus, in the case of providing a restricting portion that restricts the pivoting of the lower unit 3 about the pivot shaft 5b so that the lower unit 3 does not switch to a horizontal orientation, it is preferable to provide a restriction portion that restricts the displacement of the switching lever 8 so that the switching lever 8 also does not switch to the soft separation position.

Returning to FIG. 3, a transport roller pair 16 as a first feeding roller pair, a reading portion 20 as a reader that reads a document image, and a discharge roller pair 17 as a second feeding roller pair are provided downstream of the feeding roller 14. The transport roller pair 16 includes a transport drive roller 16a, which is rotationally driven by a motor (not illustrated), and a transport driven roller 16b that is driven to rotate.

The document nipped by the feeding roller 14 and the separation roller 15 and fed downstream is nipped by the transport roller pair 16, and is transported to a position facing an upper sensor unit 20A and a lower sensor unit 20B located downstream of the transport roller pair 16.

The reading portion 20 includes the upper sensor unit 20A located above the document transport path T and provided in the upper unit 4, and the lower sensor unit 20B located below the document transport path T and provided in the lower unit 3. The upper sensor unit 20A has a sensor module 21A, and the lower sensor unit 20B has a sensor module 21B. In the present embodiment, the sensor modules 21A and 21B are contact-type image sensor modules (CISM).

The upper surface of the document is read by the sensor module 21A located above the document transport path T, and the lower surface of the document is read by the sensor module 21B located below the document transport path T.

A document reading surface (not illustrated) of the upper sensor unit 20A and a document reading surface (not illustrated) of the lower sensor unit 20B are parallel to the document transport path T.

The upper sensor unit 20A includes a background plate 22A at a position facing the sensor module 21B of the lower sensor unit 20B, and the lower sensor unit 20B includes a background plate 22B at a position facing the sensor module 21A of the upper sensor unit 20A.

The background plates 22A and 22B are reference plates that are read by the opposing sensor modules for shading correction; for example, a resin plate of white, gray, black or the like, or a metal plate or the like painted white, gray, black, or the like can be used.

The background plates 22A and 22B are provided so as to pivot by the motive power of a motor (not illustrated), and by pivoting, it is possible to switch between a facing state in which the background plates 22A and 22B face the opposing sensor modules as illustrated by a solid line and a non-facing state in which the facing state is cancelled as illustrated by a two-dot chain line. The background plates 22A and 22B are, for example, white, and, in the facing state, a white reference value can be obtained, and in the non-facing state, a black reference value can be obtained.

After an image on at least one of the upper surface and lower surface of the document has been read by the reading portion 20, the document is nipped by the discharge roller pair 17, which is located downstream of the reading portion 20, and is discharged from a discharge port 18.

The discharge roller pair 17 includes a discharge drive roller 17a that is rotationally driven by a motor (not illustrated) and a discharge driven roller 17b that is driven to rotate.

Next, the configuration of the upper unit 4 and the front surface cover 19 around a pivot shaft will be described in detail. As described above, the front surface cover 19 is an example of the first pivoting body and the discharge tray, and the upper unit 4 is an example of the second pivoting body.

Here, the pivoting ranges of the front surface cover 19 and the upper unit 4 will be described with reference to FIG. 5. FIG. 5 illustrates a state in which the front surface cover 19 and the upper unit 4 are fully open. Further, the state in which the front surface cover 19 and the upper unit 4 are fully closed is illustrated in FIG. 1.

In FIG. 5, the straight line Lv is a vertical line passing through the axis center of the pivot shaft 30 described later. The angle α1 is the pivot angle between the state in which the front surface cover 19 is closed and the vertical orientation, and the angle α2 is the pivot angle between the state in which the front surface cover 19 is opened and the vertical orientation. Further, the vertical orientation of the front surface cover 19 refers to a neutral orientation in which the front surface cover 19 does not pivot in either the closing direction or the opening direction.

Since the angle α2 is larger than the angle α1, in a case in which no external force acts on the front surface cover 19, when pivoting from the vertical orientation to the opening direction, the impact when the pivoting stops is larger than when pivoting from the vertical orientation to the closing direction.

The angle β1 is the pivot angle between the closed state of the upper unit 4 and the vertical orientation, and the angle β2 is the pivot angle between the open state of the upper unit 4 and the vertical orientation. Further, the vertical orientation of the upper unit 4 refers to a neutral orientation in which the upper unit 4 does not pivot in either the closing direction or the opening direction.

Since the angle β1 is larger than the angle β2, in a case in which no external force acts on the upper unit 4, when pivoting from the vertical orientation in the closing direction, the impact when the pivoting stops is greater than when pivoting from the vertical position in the opening direction.

Figure 9:
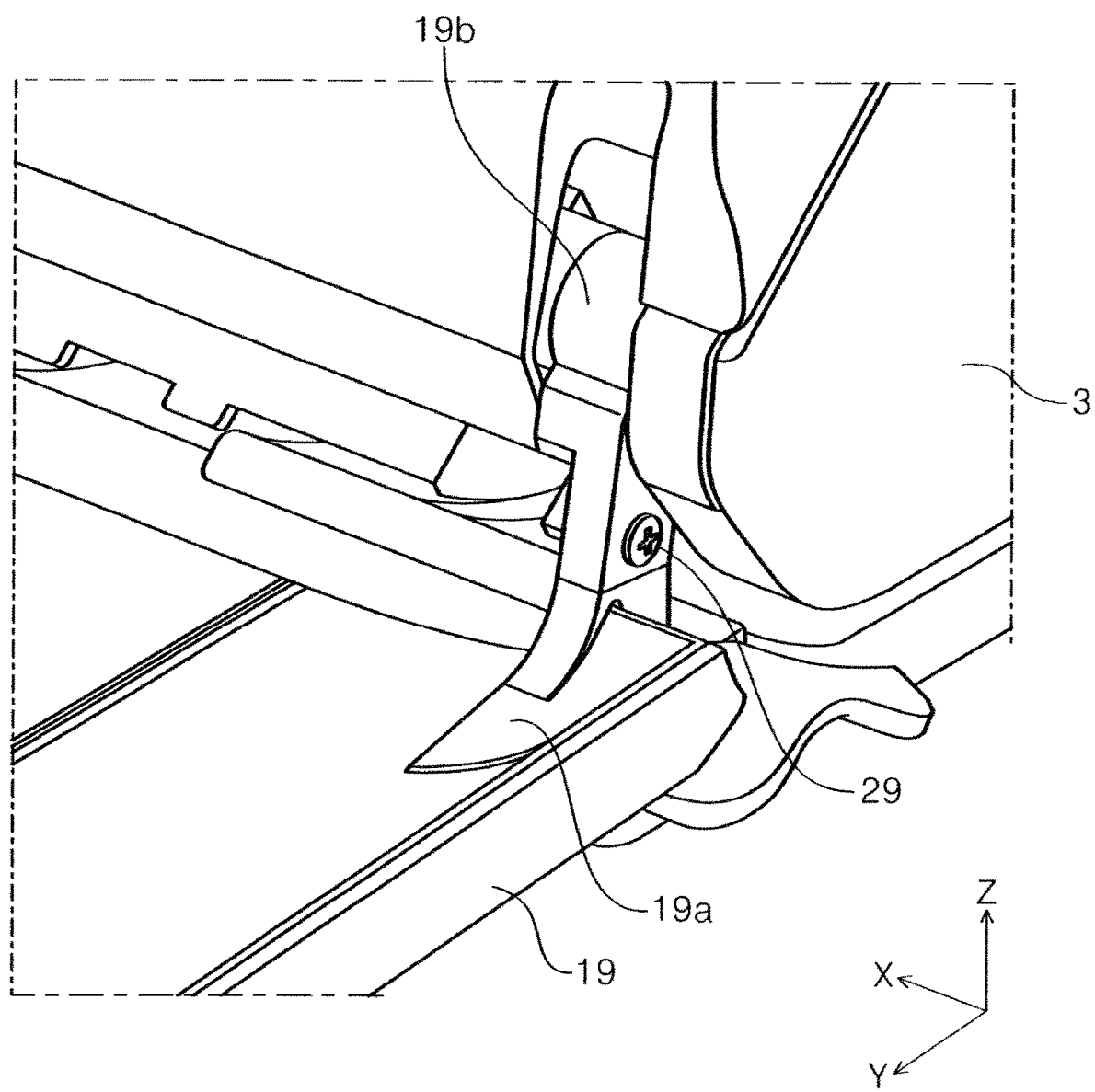
FIG. 9 is a partially enlarged perspective view of the front surface cover.
Figure 10:
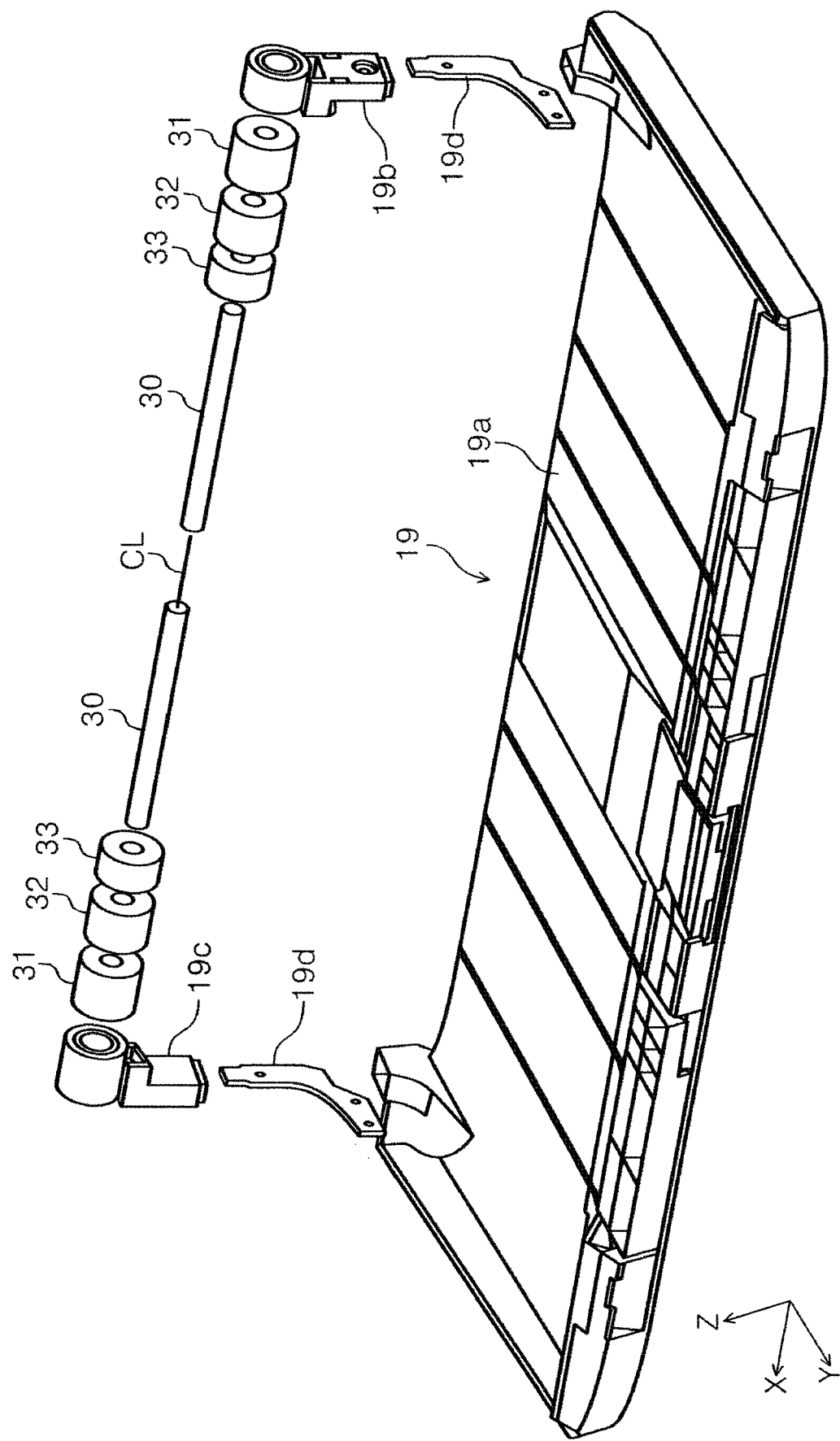
FIG. 10 is an exploded perspective view of the front surface cover.

Next, in FIGS. 9 and 10, the front surface cover 19 includes a main body portion 19a, arm portions 19b and 19c, and a reinforcing plate 19d. In the present embodiment, the main body portion 19a and the arm portions 19b and 19c are formed of a resin material, and the reinforcing plate 19d is formed of a metal plate material.

The arm portions 19b and 19c are portions supported by the pivot shaft 30 (described later), and the arm portions 19b and 19c can be supported by the pivot shaft 30 in a state where the arm portions 19b and 19c and the main body portion 19a are separated. Then, after that, the main body portion 19a can be coupled to the arm portions 19b and 19c. In FIG. 9, reference sign 29 denotes a screw that fixes the main body portion 19a to the arm portion 19b. With such a configuration, the front surface cover 19 can be easily attached to the apparatus main body 2.

Further, the reinforcing plate 19d is built in at the coupling portions between the main body portion 19a and the arm portions 19b and 19c. As a result, the strength of the coupling portion between the main body portion 19a and the arm portions 19b and 19c is secured.

Next, first dampers 31, second dampers 32, and first one-way clutches 33 are provided in the +X direction with respect to the arm portion 19b and in the −X direction with respect to the arm portion 19c, respectively. The pivot shaft 30 is inserted through the arm portion 19b or the arm portion 19c, the first damper 31, the second damper 32, and the first one-way clutch 33.

Hereinafter, the structure around the pivot shaft 30 on the side of the arm portion 19c located in the +X direction in the X axis direction will be further described with reference to FIG. 11. Further, a structure (not illustrated) around the pivot shaft 30 on the side of the arm portion 19b located in the −X direction in the X axis direction, and the structure illustrated in FIG. 11 are left-right symmetric structures, and the description of the structure around the pivot shaft 30 on the side of the arm portion 19b will be omitted below.

Figure 11:
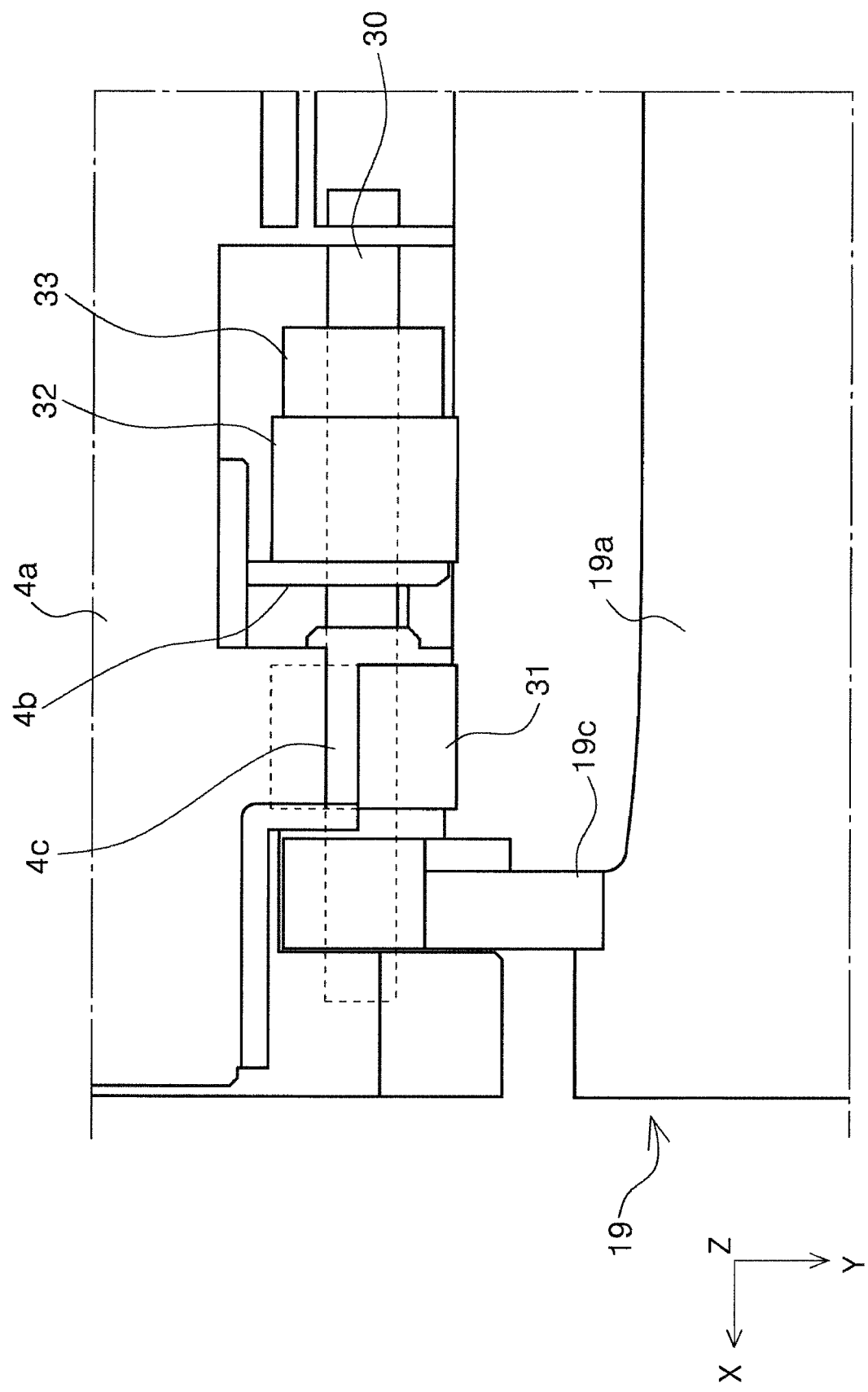
FIG. 11 is a partially enlarged plan view of the front surface cover and the upper unit.

In FIG. 11, the pivot shaft 30 is a metal shaft and is fixed to the lower unit 3 (not illustrated in FIG. 11), that is, the pivot shaft 30 is fixed to the lower unit 3 so as not to pivot with respect to the lower unit 3.

Reference sign 4a denotes a frame that forms the base of the upper unit 4, and a fixing portion 4b that is integrally formed with the frame 4a is fixed to the second damper 32 that serves as a second damping portion. In addition, the second damper 32 is fixed to a first rotating portion (not illustrated) of the first one-way clutch 33. A second rotating portion (not illustrated) of the first one-way clutch 33 is fixed to the pivot shaft 30. The first one-way clutch 33 is a one-way clutch including the first rotating portion (not illustrated) and the second rotating portion (not illustrated) that rotate idly relative to each other in a predetermined rotating direction and rotate together in the opposite direction.

The second damper 32 damps the pivoting of the upper unit 4; however, the first one-way clutch 33 prevents the damping force of the second damper 32 from acting on the upper unit 4 when the upper unit 4 is opened. Therefore, the damping force of the second damper 32 acts on the upper unit 4 only when the upper unit 4 is closed.

The arm portion 19c of the front surface cover 19 is fixed to the first damper 31. The first damper 31 is held by a holding portion 4c formed integrally with the frame 4a. Therefore, when the front surface cover 19 pivots relative to the upper unit 4, the damping force of the first damper 31 acts on the front surface cover 19. When the upper unit 4 and the front surface cover 19 pivot integrally, the damping force of the first damper 31 does not act on the front surface cover 19.

Then, when the front surface cover 19 is opened, and when the upper unit 4 is closed from the open state, the damping force of the first damper 31 acts on the upper unit 4 via the holding portion 4c.

The configuration described above is summarized as follows. That is, the scanner 1 includes the lower unit 3 and the front surface cover 19 serving as a first pivoting body that, by pivoting with respect to the lower unit 3, can take a closed state and an open state in which the front surface cover 19 is more separated from the lower unit 3 than in the closed state. In addition, the scanner 1 includes the upper unit 4 serving as a second pivoting body that forms a document transport path T with the lower unit 3 therebetween and that, by pivoting with respect to the lower unit 3, can take a closed state in which the upper unit 4 is located between the lower unit 3 and the front surface cover 19 and an open state in which the upper unit 4 is more separated from the lower unit 3 than in the closed state.

The pivot shaft 30 serves as a first pivot shaft, which is the pivot shaft of the front surface cover 19, and a second pivot shaft, which is the pivot shaft of the upper unit 4; that is, the axis center of the first pivot shaft and the axis center of the second pivot shaft are common. A straight line CL in FIG. 10 indicates the axis center of the pivot shaft 30.

The first damper 31 that damps pivoting of the front surface cover 19 in at least the opening direction and a second damper 32 that damps pivoting of the upper unit 4 in at least the closing direction are provided, and the upper unit 4 is configured to engage with the first damper 31 via the holding portion 4c. As a result, when the upper unit 4 is closed from at least the state where the front surface cover 19 and the upper unit 4 are opened, the damping force of the first damper 31 is applied to the upper unit 4 in addition to the damping force of the second damper 32.

As a result, the pivoting of the upper unit 4 can be reliably damped while the second damper 32 is reduced in size, that is, while suppressing an increase in the size of the apparatus.

In particular, the upper unit 4 is heavier than the front surface cover 19 and, as described with reference to FIG. 5, pivots in the closing direction and a large impact is generated when the pivoting stops. When the upper unit 4 as described above is closed, the damping force of the first damper 31 is applied in addition to the damping force of the second damper 32, so that the impact when the upper unit 4 is closed can be effectively mitigated.

In addition, due to the upper unit 4 engaging with the second damper 32 via the first one-way clutch 33, the damping force of the second damper 32 does not act when the upper unit 4 pivots in the opening direction, and the damping force of the second damper 32 acts when the upper unit 4 pivots in the closing direction. Consequently, the operability when opening the upper unit 4 is improved. Further, as illustrated in FIG. 5, because the pivot angle β2 when the upper unit 4 is opened from the vertical orientation is small, even when the damping force of the second damper 32 does not act when the upper unit 4 is opened, a problematic impact does not occur.

In addition, since, in this embodiment, the pivot shaft of the front surface cover 19, that is, the first pivot shaft, and the pivot shaft of the upper unit 4, that is, the second pivot shaft, are formed by a common shaft body, that is, the pivot shaft 30, the cost of the apparatus can be reduced.

In addition, in this embodiment, the first damper 31 is provided on each side of the front surface cover 19 in the axial direction of the pivot shaft 30, that is, the X-axis direction, that is, on the arm portion 19b side and the arm portion 19c side. In addition, similarly, the second damper 32 is also provided on each side of the upper unit 4 in the X-axis direction. As a result, the effect of damping the pivoting of each damper can be obtained in a balanced manner in the X-axis direction.

In addition, since the front surface cover 19 includes the arm portions 19b and 19c supported by the pivot shaft 30 and the main body portion 19a attached to the arm portions 19b and 19c, the assemblability is improved as compared with a configuration in which the arm portions 19b and 19c and the main body portion 19a are integrated.

Figure 12:
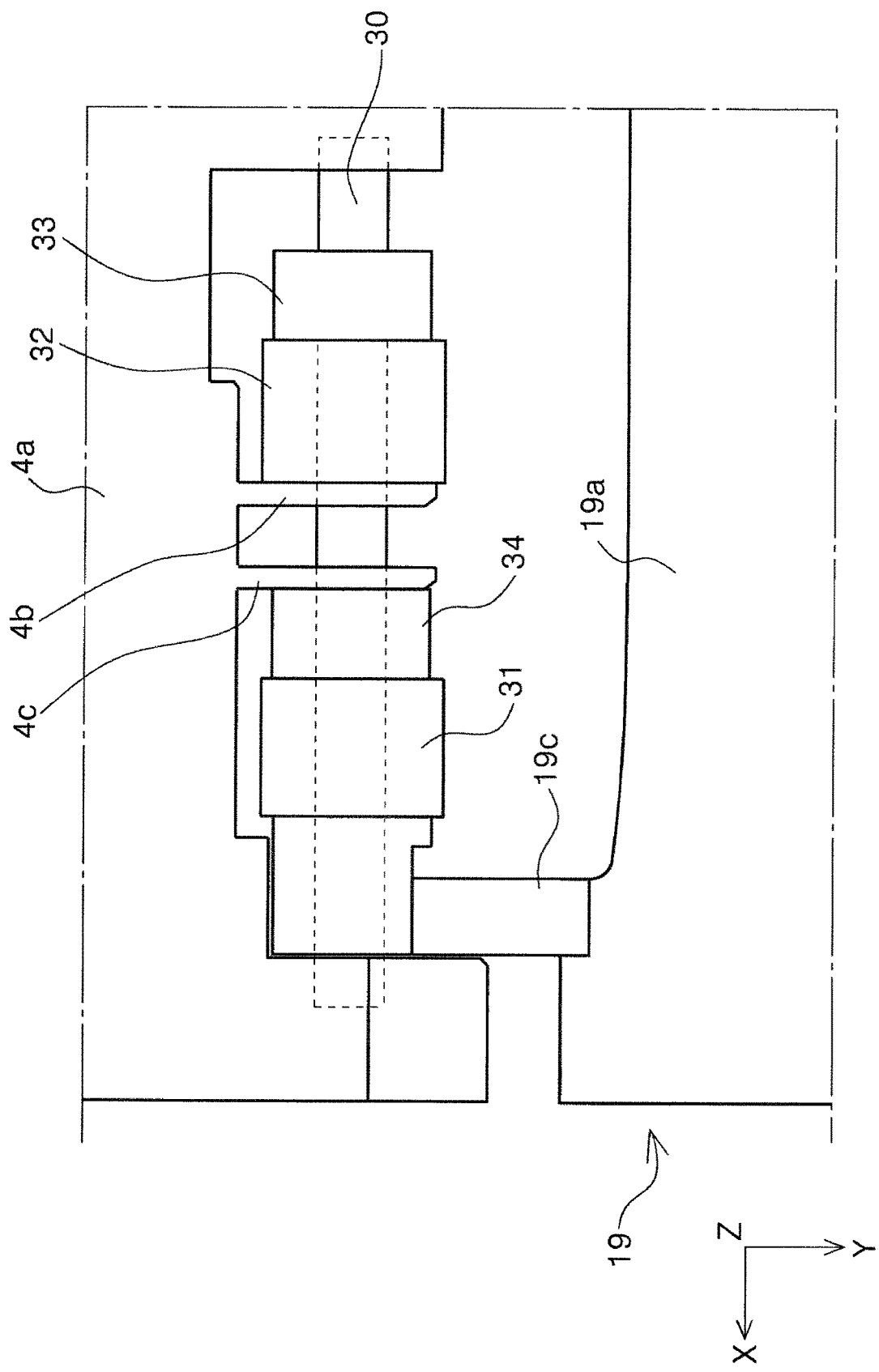
FIG. 12 is a partially enlarged plan view of the front surface cover and the upper unit.

Further, in the above-described embodiment, although the damping force of the first damper 31 acts on the front surface cover 19 both when the front surface cover 19 is opened and when the front surface cover 19 is closed, a second one-way clutch 34 may be provided with the front surface cover 19 as in the embodiment illustrated in FIG. 12 such that when the front surface cover 19 pivots in the opening direction, the damping force of the first damper 31 acts on the front surface cover 19, and when the front surface cover 19 pivots in the closing direction, the damping force of the first damper 31 does not act on the front surface cover 19. This improves the operability when closing the front surface cover 19. Further, in FIG. 12, the first damper 31 is fixed to a first rotating portion (not illustrated) of the second one-way clutch 34. A second rotating portion (not illustrated) of the second one-way clutch 34 is fixed to the holding portion 4c. The second one-way clutch 34 is a one-way clutch including the first rotating portion (not illustrated) and the second rotating portion (not illustrated) that rotate idly relative to each other in a predetermined rotating direction and rotate together in the opposite direction.

Further, as illustrated in FIG. 5, since the pivot angle α1 when the front surface cover 19 is closed from the vertical orientation is smaller than the pivot angle α2 when the front surface cover 19 is opened, and since the front surface cover 19 is lightweight in the present embodiment, even when the damping force of the first damper 31 does not act when the front surface cover 19 is closed, a problematic impact does not occur.

It goes without saying that the present disclosure is not limited to the above embodiment, and various modifications are possible within the scope of the disclosure described in the claims, and they are also included in the scope of the present disclosure.

In addition, although the above embodiment describes the opening/closing structure of the front surface cover 19 and the upper unit 4 in the scanner 1, it is also applicable to an opening/closing apparatus that includes a first pivoting body capable of taking a closed state and an open state more separated from a unit body than in the closed state by pivoting with respect to the unit body and a second pivoting body capable of taking a closed state located between the unit body and the first pivoting body and an open state more separated from the unit body than in the closed state by pivoting with respect to the unit body.

More specifically, in the opening/closing apparatus, the axis center of the first pivot shaft, which is the pivot shaft of the first pivoting body, and the axis center of the second pivot shaft, which is the pivot shaft of the second pivoting body, are common, and the opening/closing apparatus includes a first damping portion that damps at least pivoting of the first pivoting body in the opening direction, and a second damping portion that damps at least pivoting of the second pivoting body in the closing direction. Then, the second pivoting body is configured to engage with the first damping portion, and, when the second pivoting body is closed from the state in which at least the first pivoting body and the second pivoting body are opened, the second pivoting body is configured such that the damping force of the first damping portion is applied to the second pivoting body in addition to the damping force of the second damping portion.

What is claimed is:

1. An image reading apparatus comprising:
a lower unit that includes a reader that reads a document;
a discharge tray that is a pivoting body configured to, by pivoting with respect to the lower unit, take a closed state and an open state in which the discharge tray is more separated from the lower unit than in the closed state, and on which documents scanned and discharged are stacked;
an upper unit that is a pivoting body configured to, by pivoting with respect to the lower unit, take a closed state in which the upper unit is located between the lower unit and the discharge tray and an open state in which the upper unit is more separated from the lower unit than in the closed state, and that forms a document transport path with the lower unit between the upper unit and the lower unit;
a first damping portion that damps pivoting of the discharge tray in at least an opening direction; and
a second damping portion that damps pivoting of the upper unit in at least a closing direction, wherein
an axis center of a first pivot shaft that is a pivot shaft of the discharge tray and an axis center of a second pivot shaft that is a pivot shaft of the upper unit are common,
the upper unit is configured to engage with the first damping portion, and
when the upper unit is closed from a state in which at least the discharge tray and the upper unit are opened, a damping force of the first damping portion is applied to the upper unit in addition to a damping force of the second damping portion.

2. The image reading apparatus according to claim 1, further comprising
a first one-way clutch interposed between the upper unit and the second pivot shaft, wherein
by action of the first one-way clutch, when the upper unit pivots in an opening direction, the damping force of the second damping portion does not act on the upper unit, and when the upper unit pivots in the closing direction, the damping force of the second damping portion acts on the upper unit.

3. The image reading apparatus according to claim 2, further comprising a second one-way clutch interposed between the discharge tray and the first pivot shaft, wherein by action of the second one-way clutch, when the discharge tray pivots in the opening direction, the damping force of the first damping portion acts on the discharge tray, and when the discharge tray pivots in a closing direction, the damping force of the first damping portion does not act on the discharge tray.

4. The image reading apparatus according to claim 1, wherein the first pivot shaft and the second pivot shaft are configured by a shaft body in common.

5. The image reading apparatus according to claim 1, wherein the first damping portion is provided on each side of the discharge tray in an axial direction of the first pivot shaft, and the second damping portion is provided on each side of the upper unit in an axial direction of the second pivot shaft.

6. The image reading apparatus according to claim 1, wherein the discharge tray includes an arm portion supported by the first pivot shaft, and a tray body portion attached to the arm portion.

7. An opening/closing apparatus comprising:

a first pivoting body configured to, by pivoting with respect to a unit body, take a closed state and an open state in which the first pivoting body is more separated from the unit body than in the closed state;

a second pivoting body configured to, by pivoting with respect to the unit body, take a closed state in which the second pivoting body is located between the unit body and the first pivoting body and an open state in which the second pivoting body is more separated from the unit body than in the closed state;

a first damping portion that damps pivoting of the first pivoting body in at least an opening direction; and a second damping portion that damps pivoting of the second pivoting body in at least a closing direction, wherein an axis center of a first pivot shaft that is a pivot shaft of the first pivoting body and an axis center of a second pivot shaft that is a pivot shaft of the second pivoting body are common, the second pivoting body is configured to engage with the first damping portion, and when the second pivoting body is closed from a state in which at least the first pivoting body and the second pivoting body are opened, a damping force of the first damping portion is applied to the second pivoting body in addition to a damping force of the second damping portion.

* * * * *